(12) United States Patent
Suzuki et al.

(10) Patent No.: US 8,781,682 B2
(45) Date of Patent: Jul. 15, 2014

(54) ELECTRIC POWER STEERING SYSTEM

(75) Inventors: Hiroshi Suzuki, Okazaki (JP); Naoki Yamano, Okazaki (JP); Terutaka Tamaizumi, Okazaki (JP); Akira Nambu, Okazaki (JP)

(73) Assignee: JTEKT Corporation, Osaka (JP)

( * ) Notice: Subject to any disclaimer, the term of this patent is extended or adjusted under 35 U.S.C. 154(b) by 126 days.

(21) Appl. No.: 12/828,509

(22) Filed: Jul. 1, 2010

(65) Prior Publication Data

US 2011/0010050 A1 Jan. 13, 2011

(30) Foreign Application Priority Data

Jul. 8, 2009 (JP) ................................. 2009-162055

(51) Int. Cl.
| | | |
|---|---|---|
| A01B 69/00 | (2006.01) | |
| B62D 6/00 | (2006.01) | |
| B62D 11/00 | (2006.01) | |
| B62D 12/00 | (2006.01) | |
| B63G 8/20 | (2006.01) | |
| B63H 25/04 | (2006.01) | |
| G05D 1/00 | (2006.01) | |
| G06F 7/00 | (2006.01) | |
| G06F 17/00 | (2006.01) | |
| G06F 19/00 | (2011.01) | |

(52) U.S. Cl.
USPC ............................................. 701/41; 701/42

(58) Field of Classification Search
USPC ..................................................... 701/41, 42
See application file for complete search history.

(56) References Cited

U.S. PATENT DOCUMENTS

| | | | |
|---|---|---|---|
| 5,482,129 A | 1/1996 | Shimizu | |
| 2001/0002631 A1* | 6/2001 | Okanoue et al. | 180/446 |
| 2002/0005314 A1* | 1/2002 | Takehara et al. | 180/443 |
| 2002/0116105 A1 | 8/2002 | Chen et al. | |
| 2004/0186640 A1* | 9/2004 | Norito | 701/41 |
| 2005/0236223 A1* | 10/2005 | Yokota | 180/446 |
| 2007/0198153 A1* | 8/2007 | Oya et al. | 701/41 |
| 2008/0033613 A1 | 2/2008 | Tamaizumi et al. | |

(Continued)

FOREIGN PATENT DOCUMENTS

| | | |
|---|---|---|
| CN | 101218146 B | 10/2012 |
| EP | 1 616 774 A2 | 1/2006 |

(Continued)

OTHER PUBLICATIONS

Extended European Search Report issued in European Patent Application No. 10168731.7 on Nov. 4, 2010.

(Continued)

*Primary Examiner* — Imran Mustafa
(74) *Attorney, Agent, or Firm* — Oliff PLC

(57) ABSTRACT

A motor control signal output unit of an electric power steering system includes a feedback gain calculation unit (52), and a feedback control unit executes a feedback control with the use of a proportional gain (Kp) and an integral gain (Ki) that are calculated by the feedback gain calculation unit (52). The feedback gain calculation unit (52) sets the feedback gains to large values (Kp=P0, Ki=I0) when the absolute value of an assist gradient ($\alpha$) is equal to or smaller than a predetermined value ($\alpha 0$) ($|\alpha| \leq \alpha 0$). On the other hand, when the absolute value of the assist gradient ($\alpha$) exceeds the predetermined value ($\alpha 0$) ($|\alpha| > \alpha 0$), the feedback gain calculation unit (52) sets the feedback gains to small values (Kp=p1, Ki=I1: P1<P0, I1<I0).

8 Claims, 7 Drawing Sheets

(56) References Cited

U.S. PATENT DOCUMENTS

| | | | |
|---|---|---|---|
| 2009/0069979 A1 | 3/2009 | Yamashita et al. | |
| 2009/0112405 A1 | 4/2009 | Tamaizumi et al. | |
| 2009/0240389 A1* | 9/2009 | Nomura et al. | 701/29 |

FOREIGN PATENT DOCUMENTS

| | | |
|---|---|---|
| EP | 1 816 053 A1 | 8/2007 |
| EP | 2 055 613 A2 | 5/2009 |
| JP | A-2001-239947 | 9/2001 |
| JP | B2-3231932 | 11/2001 |
| JP | A-2005-170283 | 6/2005 |
| JP | A-2006-131191 | 5/2006 |
| JP | A-2008-6919 | 1/2008 |

OTHER PUBLICATIONS

Office Action dated Jan. 14, 2014 issued in Chinese Patent Application No. 201010224611.6 (with partial English translation).

* cited by examiner

F I G. 2
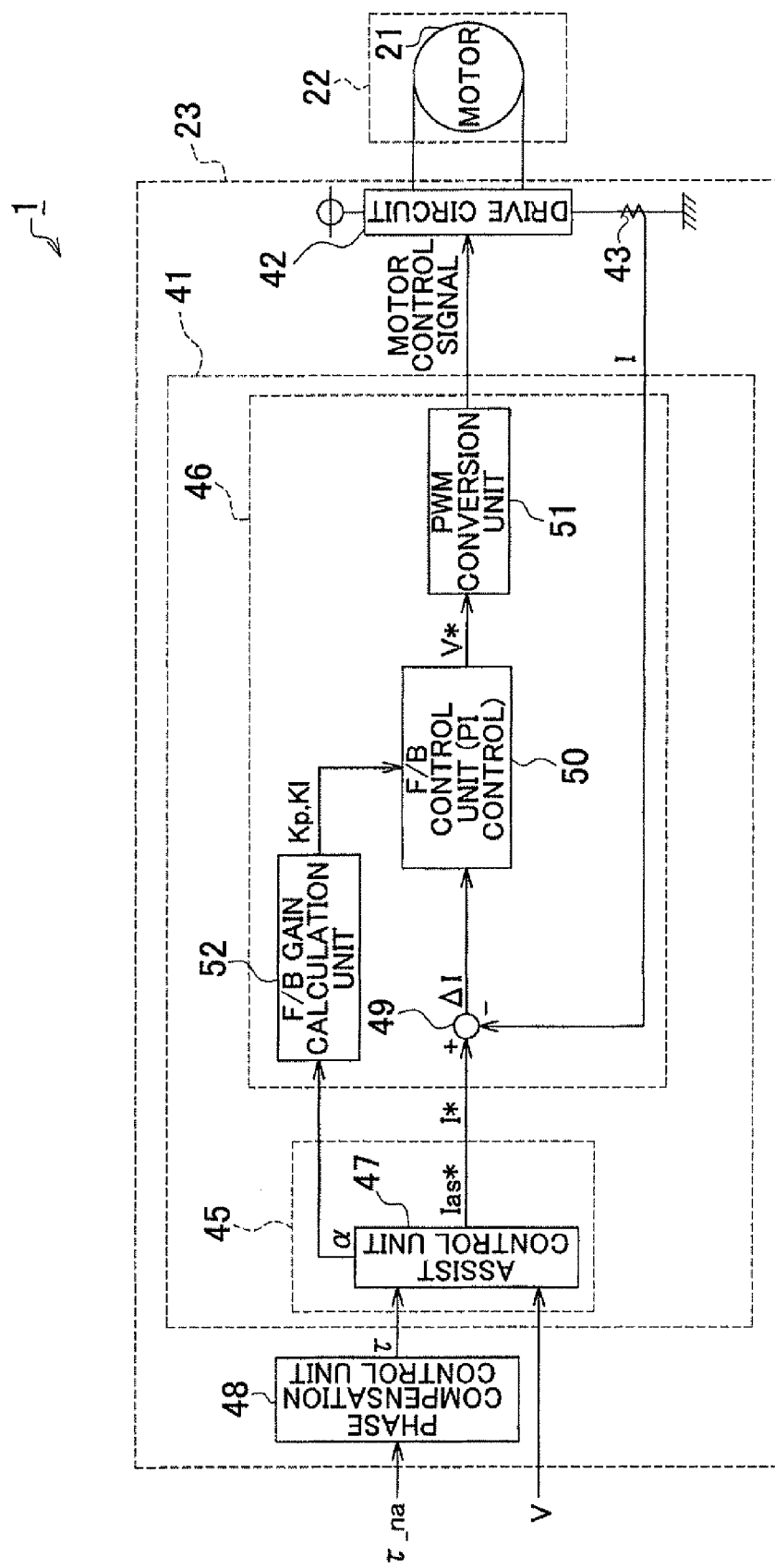

ELECTRIC POWER STEERING SYSTEM

INCORPORATION BY REFERENCE

The disclosure of Japanese Patent Application No. 2009-162055 filed on Jul. 8, 2009 including the specification, drawings and abstract is incorporated herein by reference in its entirety.

BACKGROUND OF THE INVENTION

1. Field of the Invention

The invention relates to an electric power steering system.

2. Description of the Related Art

Power steering systems for a vehicle include an electric power steering system (EPS) that uses a motor as a drive source. In an EPS, usually, a control unit thereof detects a steering torque that is transmitted via a steering shaft, and calculates a target assist force that should be applied to a steering system based on the steering torque. Then, the control unit executes a feedback control so that an actual current value is brought to a current command value that corresponds to the target assist force. Thus, the control unit controls an operation of an actuator by adjusting a drive current that is applied to a motor.

In the EPS, an increase in quietness is one of the most important issues to be addressed. Examples of the situations where an increase in quietness is especially demanded include a situation where a steering operation is performed when a vehicle is traveling at a low speed, and a situation where a steering operation is performed when the vehicle is not traveling, that is, a steering wheel is turned by a large amount when the vehicle is not traveling.

When the vehicle is traveling at a low speed, a road reaction force is large. Therefore, a higher torque is required to perform a steering operation. Therefore, noise and vibration are likely to be generated due to an operation of a motor used as a drive source. Especially when the vehicle is not traveling, a steering wheel is turned relatively slowly. Therefore, a driver easily realizes generation of the noise and vibration.

In order to address the above-described problem, Japanese Patent No. 3231932 describes a technology in which a feedback gain is changed based on a vehicle speed to decrease the response of a control. Similarly, Japanese Patent Application Publication No. 2001-239947 (JP-A-2001-239947) describes a technology in which a feedback gain is changed based on a steering speed (rotational speed of a steering wheel).

One of the major factors of the above-described noise and vibration is a ripple component that is contained in the detected steering torque and that is produced due to configurations outside the motor that is used as the drive source, for example, changes in the states of the mesh of speed reduction gears. A target assist force is calculated based on the steering torque that contains the ripple component, and the feedback control is executed based on a current command value that corresponds to the target assist force. Then, the ripple component is amplified and the above-described noise and vibration are generated. Accordingly, as described above, if the feedback gain is changed to decrease the response of the feedback control, amplification of the ripple component is suppressed. According to the technologies described in the above-described documents, the situation where abnormal noise and vibration are likely to become obvious is estimated based on a vehicle speed or a steering speed and the response of the feedback control is decreased. In this way, quietness is increased while a good steering feel is maintained.

However, according to the technologies described in the above-mentioned documents, it is estimated that abnormal noise and vibration are likely to become obvious when the vehicle is traveling at a low speed or when a steering speed is low. However, even when the vehicle is traveling at a low speed or when the steering speed is low, vibration and abnormal noise are sometimes less likely to be generated. For example, on a road having a low friction coefficient μ, a detected steering torque is a low value because a road reaction force is low. Therefore, the influence of the ripple component contained in the steering torque is limited. In such a case, if the response of the feedback control is decreased, the steering wheel is not returned appropriately and a steering angle is not decreased to a desired value. This results in deterioration of a steering feel. Therefore, there is still a room for improvement of the steering feel.

Japanese Patent Application Publication No. 2008-6919 describes a technology in which a feedback gain is changed based on a value of electric current actually applied to a motor. However, even if the level of detected actual current value is high, noise and vibration are sometimes less likely to become obvious. Therefore, an adverse effect of a decrease in the response of a control may be caused, as in the technologies described in the above-mentioned documents.

Japanese Patent Application Publication No. 2006-131191 (JP-A-2006-131191) describes a technology in which characteristics of a phase compensation control that is executed on a detected steering torque are changed based on the ratio of a change in a base assist component to a change in a steering torque. Thus, a steering feel is improved. However, a frequency band that is a target of the phase compensation control differs from a frequency of a ripple component contained in the steering torque. Therefore, the technology described in JP-A-2006-131191 does not solve the above-described problem, either.

SUMMARY OF THE INVENTION

It is an object of the invention to provide an electric power steering system with which quietness is increased while a good steering feel is maintained.

An aspect of the invention relates to an electric power steering system that includes: a steering force assist device that applies an assist force for assisting a steering operation to a steering system using a motor as a drive source; and a control unit that controls an operation of the steering force assist device by adjusting a drive current that is supplied to the motor. The control unit calculates a target assist force that should be generated by the steering force assist device based on a steering torque, and executes a feedback control to bring an actual current value to a current command value that corresponds to the target assist force. The feedback control is executed by multiplying a deviation of the actual current value from the current command value by a feedback gain. The control unit changes the feedback gain based on an assist gradient that is a ratio of a change in the target assist force to a change in the steering torque.

One of the major factors of noise and vibration that are generated due to an operation of the motor used as the drive source is a ripple component contained in the detected steering torque. The ripple component is amplified when the feedback control is executed. Therefore, the noise and vibration tend to become more obvious when the absolute value of the assist gradient is large. Therefore, if the feedback gain is changed based on the assist gradient as in the configuration described above, the feedback gain is changed more appropriately.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a control block diagram for the EPS;

DETAILED DESCRIPTION OF THE EMBODIMENTS

Hereafter, a first embodiment of the invention will be described with reference to the accompanying drawings.

Figure 1:
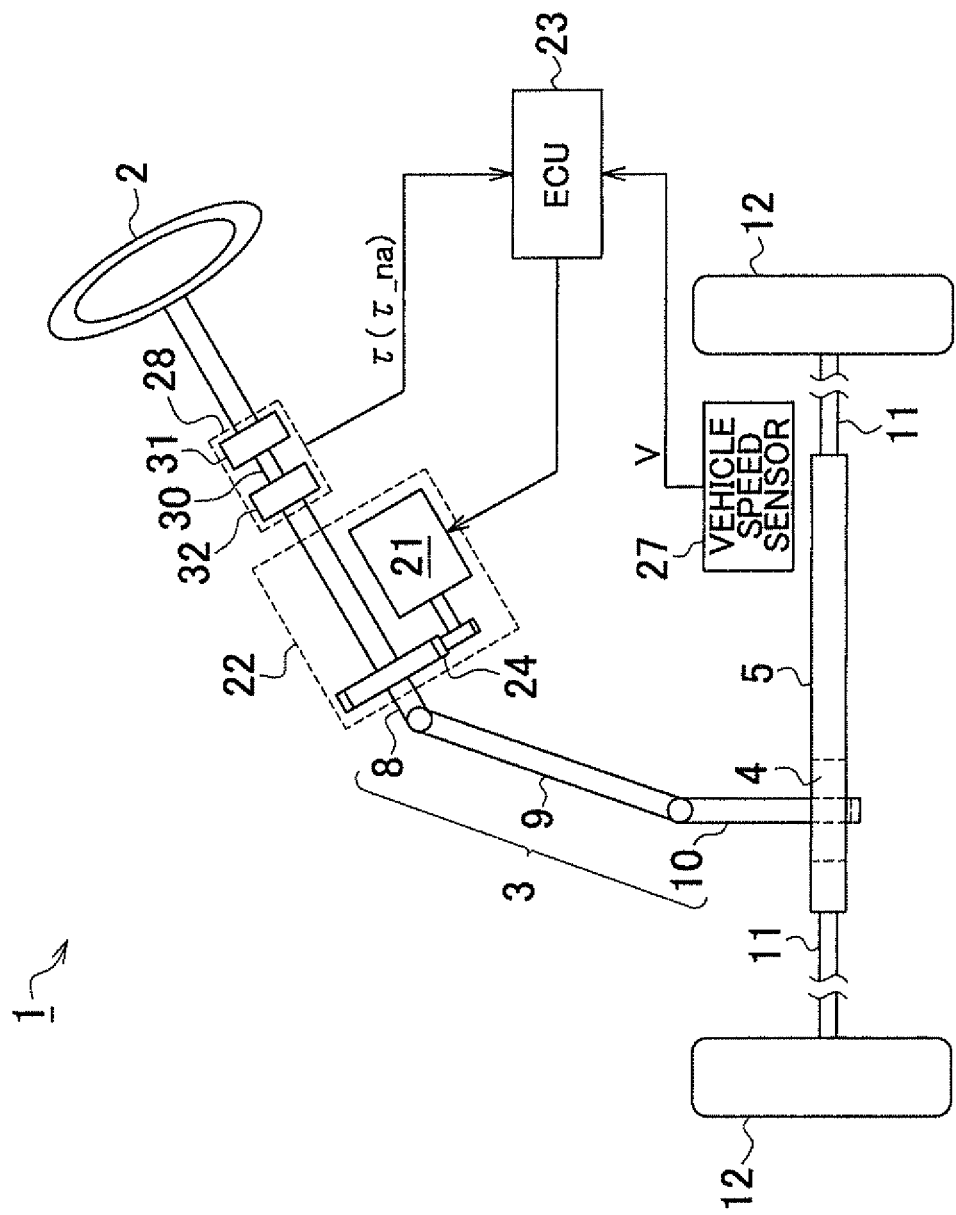
FIG. 1 is a view schematically showing the structure of an electric power steering system (EPS)

As shown in FIG. 1, in an electric power steering system (EPS) 1 according to the first embodiment, a steering shaft 3 to which a steering wheel 2 is fixed, is connected to a rack shaft 5 via rack-and-pinion mechanism 4. The rotation of the steering shaft 3 caused by a steering operation is converted into a linear reciprocation of the rack shaft 5 by the rack-and-pinion mechanism 4. The steering shaft 3 is formed by connecting a column shaft 8, an intermediate shaft 9, and a pinion shaft 10 to each other. The linear reciprocation of the rack shaft 5 caused by the rotation of the steering shaft 3 is transmitted to knuckles (not shown) via tie-rods 11 connected to respective ends of the rack shaft 5. As a result, the steering angle of steered wheels 12, that is, the direction in which a vehicle travels is changed.

The EPS 1 includes an EPS actuator 22 and an ECU 23. The EPS actuator 22 serves as a steering force assist device that applies assist force for assisting a steering operation of a steering system, using a motor 21 as a drive source. The ECU 23 serves as a control unit that controls an operation of the EPS actuator 22.

The EPS 1 according to the first embodiment is a column EPS. The motor 21 that is a drive source for the EPS actuator 22 is connected to the column shaft 8 via a speed reduction mechanism 24 so that the column shaft 8 may be driven by the motor 21. The motor 21 is a direct-current motor with a brush. The speed reduction mechanism 24 is a worm-and-wheel speed reduction mechanism. The rotational speed of the motor 21 is reduced by the speed reduction mechanism 24, and the rotation having the reduced speed is transmitted to the column shaft 8. As a result, a motor torque is applied to the steering system as an assist force.

A vehicle speed sensor 27 and a torque sensor 28 are connected to the ECU 23. The ECU 23 detects a vehicle speed V and a steering torque $\tau(\tau\_na)$ based on signals output from these sensors. The torque sensor 28 in the first embodiment is a so-called twin-resolver torque sensor that includes a torsion bar 30 and a pair of rotational angle sensors (resolvers) 31 and 32. The torsion bar 30 is provided at an intermediate portion of the column shaft 8, more specifically, at a position closer to the steering wheel 2 than the speed reduction mechanism 24. The rotational angle sensors 31 and 32 are provided at respective ends of the torsion bar 30. The ECU 23 calculates a target assist force based on the detected state amounts. Then, the ECU 23 supplies a drive current to the motor 21 used as the drive source so that the target assist force is generated. In this way, the ECU 23 operates the EPS actuator 22 to control the assist force that is applied to the steering system.

As shown in FIG. 2, the ECU 23 includes a microcomputer 41 and a drive circuit 42. The microcomputer 41 outputs a motor control signal. The drive circuit 42 supplies a drive current to the motor 21 used as the drive source for the EPS actuator 22 based on the motor control signal.

The ECU 23 is provided with a current sensor 43 that detects an actual current value I, which is a value of an electric current actually supplied to the motor 21. The microcomputer 41 produces a motor control signal that is output to the drive circuit 42 based on the vehicle state amounts and the actual current value I of the motor 21 detected by the current sensor 43.

Control blocks described below are realized by computer programs that are executed by the microcomputer 41. The microcomputer 41 detects each of the state amounts in predetermined sampling cycles, and executes each calculation process indicated by the control block in predetermined cycles. Thus, the microcomputer 41 produces a motor control signal.

More specifically, the microcomputer 41 includes a current command value calculation unit 45 and a motor control signal output unit 46. The current command value calculation unit 45 calculates a current command value I* that is a target value for an electric current that is supplied to the motor 21. The motor control signal output unit 46 outputs a motor control signal based on the current command value I* that is calculated by the current command value calculation unit 45.

The current command value calculation unit 45 includes an assist control unit 47 that calculates an assist control amount Ias* that corresponds to a basic component of the target assist force. The vehicle speed V and the steering torque $\tau$ are input in the assist control unit 47.

The steering torque $\tau\_na$ in the form of a detection signal that is output from the torque sensor 28 is first input in a phase compensation control unit 48. The assist control unit 47 receives the vehicle speed V and the steering torque $\tau$ that has undergone a phase compensation process (filtering by a low-pass filter) executed by the phase compensation control unit 48.

Figure 3:
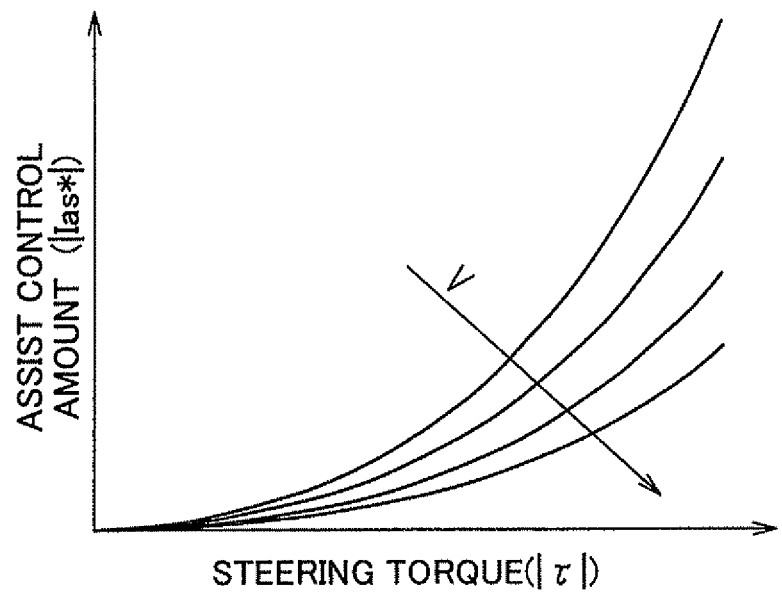
FIG. 3 is a graph illustrating the outline of calculation of an assist control amount.
Figure 4:
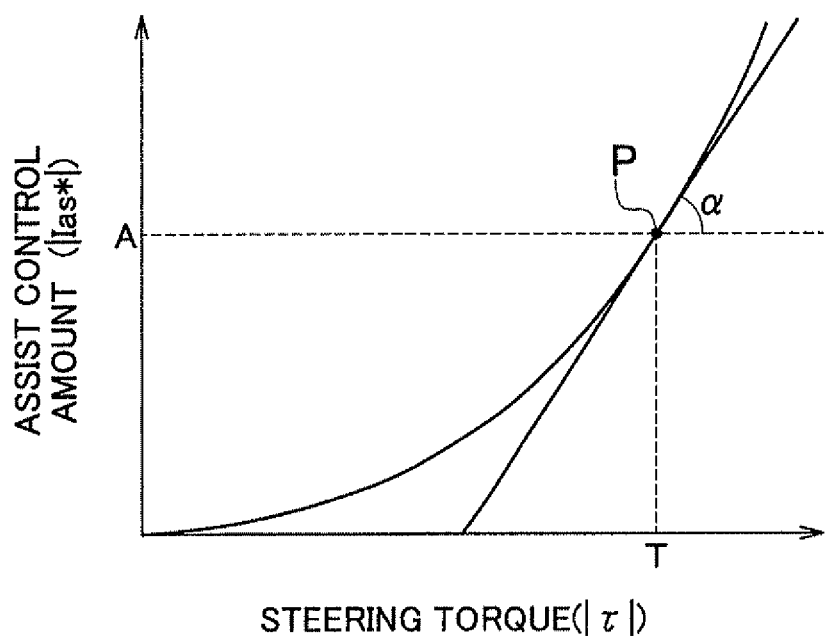
FIG. 4 is a graph illustrating an assist gradient.

As shown in FIG. 3, the assist control unit 47 calculates an assist control amount Ias* with which a larger assist force is applied, as the absolute value of the steering torque $\tau$ is larger and as the vehicle speed V is lower. FIG. 4 shows the relationship between the steering torque $\tau$ and the assist control amount Ias*. As shown in FIG. 4, as the absolute value of the steering torque $\tau$ is larger, an assist gradient $\alpha$, which is the ratio of a change in the assist control amount Ias* to a change in the steering torque τ, is higher (α=dIas*/dτ, derivative term at an operating point P(τ=T)).

As shown in FIG. 2, the motor control signal output unit 46 receives the current command value I* output from the current command value calculation unit 45, and the actual current value I detected by the current sensor 43. The motor control signal output unit 46 executes a current feedback control so that the actual current value I is brought to the current command value I*, thereby calculating the motor control signal.

More specifically, in the motor control signal output unit 46, the current command value I* and the actual current value I are input in a subtractor 49, and a deviation ΔI calculated by the subtractor 49 is input in a feedback control unit 50. The feedback control unit 50 executes a feedback control by multiplying the deviation ΔI by a feedback gain. As the feedback control, at least one of a proportional control and an integral control is executed.

The feedback control unit 50 calculates a voltage command value V* by adding a proportional component obtained by multiplying the deviation ΔI by a proportional gain Kp to an integral component obtained by multiplying an integral value of the deviation ΔI by an integral gain Ki. A PWM control unit 51 produces a motor control signal based on the voltage command value V*

The thus produced motor control signal is output from the microcomputer 41 to the drive circuit 42, and a drive current in accordance with the motor control signal is supplied from the drive circuit 42 to the motor 21. Then, a motor torque that corresponds to the target assist force is generated, and an assist force that corresponds to the target assist force is applied to the steering system.

Next, a feedback gain variable control executed in the EPS 1 according to the first embodiment will be described.

As shown in FIG. 2, a feedback gain calculation unit 52 is provided in the motor control signal output unit 46. The feedback control unit 52 executes the feedback control with the use of the proportional gain Kp and the integral gain Ki calculated by the feedback gain calculation unit 52. In the EPS 1 according to the first embodiment, the response of the feedback control is changed by changing the proportional gain Kp and the integral gain Ki. Thus, it is possible to increase the quietness by suppressing generation of noise and vibration due to the operation of the motor 21 used as the drive source, while maintaining a good steering feel.

More specifically, the assist control unit 47 provided in the current command value calculation unit 45 outputs the assist control amount Ias* that corresponds to the basic component of the target assist force and the ratio of a change in the assist control amount Ias* to a change in the steering torque τ at the time of calculation of the assist control amount Ias* (at the operating point P), that is, the assist gradient α. The feedback gain calculation unit 52 changes the proportional gain Kp and the integral gain Ki based on the assist gradient α, thereby changing the response of the feedback control that is executed by the feedback control unit 50.

Figure 5:
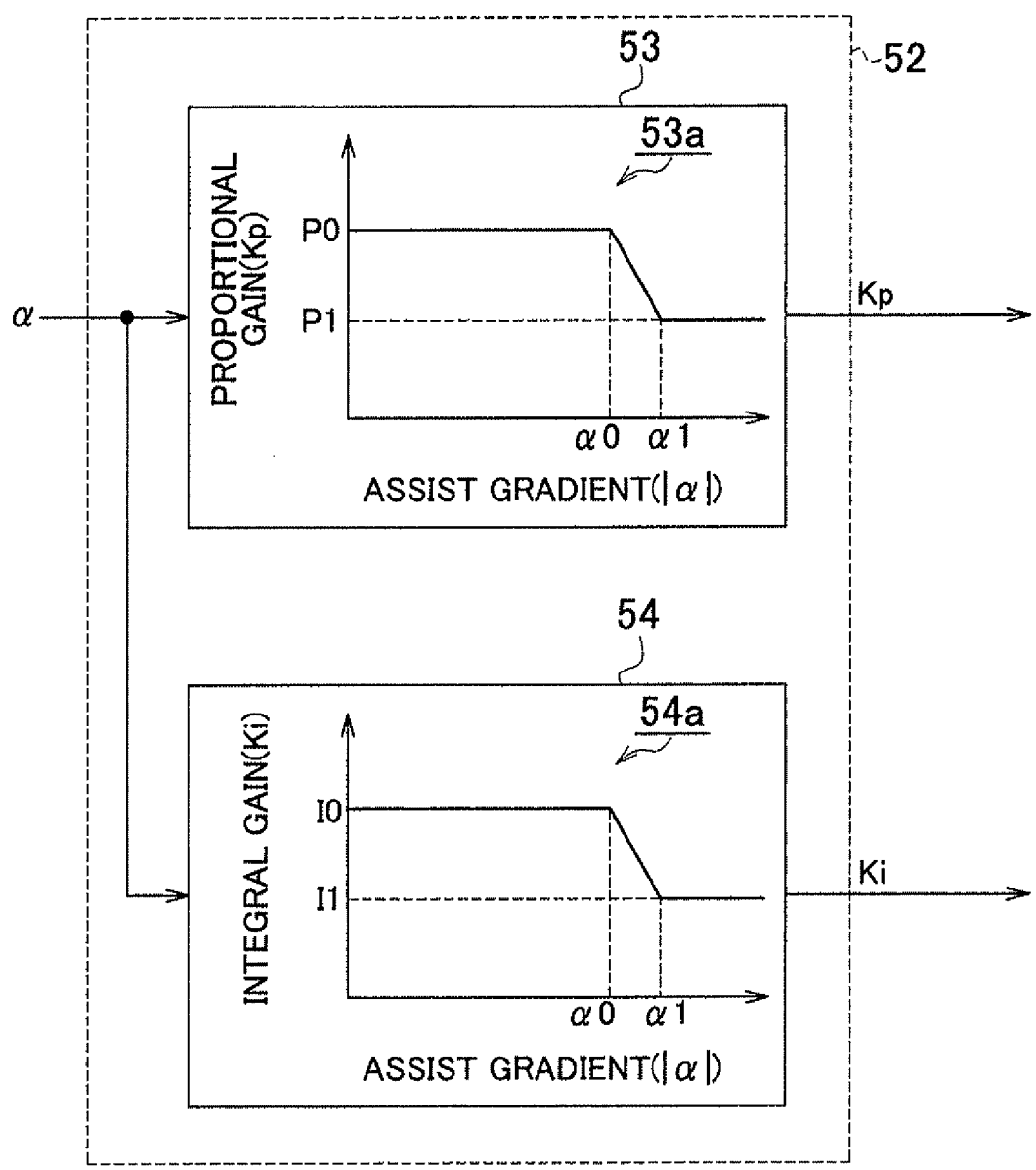
FIG. 5 is a diagram schematically showing the configuration of a feedback gain calculation unit according to a first embodiment.

As shown in FIG. 5, the feedback calculation unit 52 includes a proportional gain calculation unit 53 and an integral gain calculation unit 54. The proportional gain calculation unit 53 and the integral gain calculation unit 54 have a map 53a and a map 54a, respectively, in each of which the absolute value of the assist gradient a and the corresponding feedback gain (Kp, Ki) are correlated with each other. The proportional gain calculation unit 53 and the integral gain calculation unit 54 apply the received assist gradient α to the map 53a and the map 54a to calculate the proportional gain Kp and the integral gain Ki that correspond to the assist gradient α, respectively.

In the map 53a provided in the proportional gain calculation unit 53, the proportional gain Kp is set to a predetermined value P0 (Kp=P0) when the absolute value of the assist gradient α is equal to or smaller than a predetermined value α0 (|α|≤α0). On the other hand, when the absolute value of the assist gradient α is equal to or larger than a predetermined value α1 (|α|≥α1), the proportional gain Kp is set to a predetermined value P1 that is smaller than the predetermined value P0 (Kp=P1:P1<P0). In addition, when the absolute value of the assist gradient α is larger than the predetermined value α0 and smaller than the predetermined value α1 (α0<|α|<α1), the proportional gain Kp is linearly-interpolated between the predetermined value P0 and the predetermined value P1, more specifically, the proportional gain Kp is set to decrease from the predetermined value P0 to the predetermined value P1 with an increase in the absolute value of the assist gradient α.

Similarly, in the map 54a provided in the integral gain calculation unit 54, the integral gain Ki is set to a predetermined value I0 (Ki=I0) when the absolute value of the assist gradient α is equal to or smaller than the predetermined value α0 (|α|≤α0). On the other hand, when the absolute value of the assist gradient α is equal to or larger than the predetermined value α1 (|α|≤+1), the integral gain Ki is set to a predetermined value I1 that is smaller than the predetermined value I0 (Ki=I1:I1<I0). In addition, when the absolute value of the assist gradient α is larger than the predetermined value α0 and smaller than the predetermined value α1 (α0<|α|<α1), the integral gain Ki is linearly-interpolated between the predetermined value I0 and the predetermined value I1, more specifically, the integral gain Ki is set to decrease from the predetermined value I0 to the predetermined value I1 with an increase in the absolute value of the assist gradient α.

Figure 6:
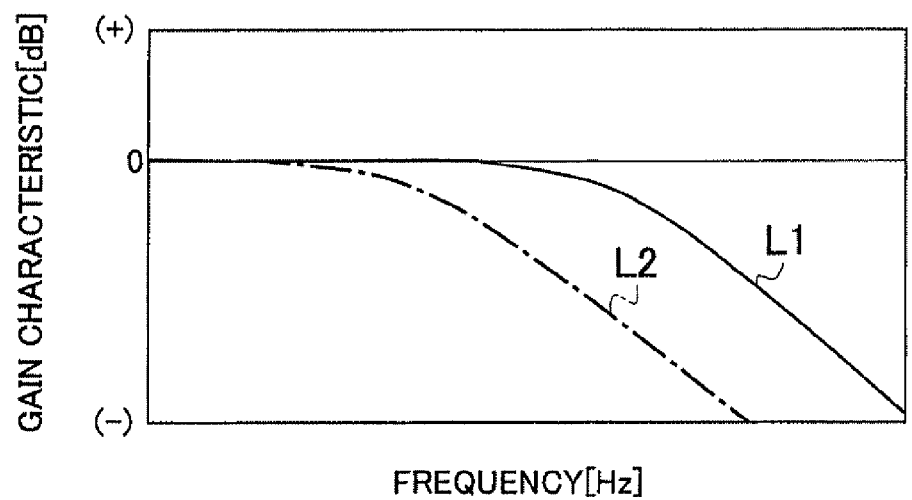
FIG. 6 is a graph illustrating a change in response of a feedback control caused by a change in a feedback gain.

The response of the feedback control that is executed by the feedback control unit 50 is changed as shown in FIG. 6, by changing the proportional gain Kp and the integral gain Ki as described above. That is, when the absolute value of the assist gradient α is small (|α|≤α0), each of the proportional gain Kp and the integral gain Ki is set to a large value (Kp=P0, Ki=I0). Thus, the response of the feedback control becomes high as indicated by a waveform L1 indicated by a solid line in FIG. 6. On the other hand, when the absolute value of the assist gradient α is large (|α|≤α1), each of the proportional gain Kp and the integral gain Ki is set to a small value (Kp=P1, Ki=I1). Thus, the response of the feedback control becomes low as indicated by a waveform L2 indicated by a chain line.

The following effects are produced according to the first embodiment.

1) The noise and vibration are generated when a steering operation is performed while the vehicle is traveling at a low speed, especially, when the steering wheel is operated by a large amount while the vehicle is not traveling. One of the major factors of the noise and vibration is a ripple component that is contained in the detected steering torque and that is produced due to configurations outside the motor that is used as the drive source, for example, a change in the mesh of speed reduction gears. The ripple component is amplified when the feedback control is executed. Therefore, the noise and vibration tend to be more obvious when the absolute value of the assist gradient α is large.

When the absolute value of the assist gradient α is large, even a slight change in the steering torque τ causes a great change in the target assist force (assist control amount Ias*).

Therefore, the ripple component is easily reflected in the target assist force. Then, the feedback control is executed based on the current command value I* that corresponds to the target assist force that changes. Thus, the ripple component is amplified, and the noise and vibration are generated.

Therefore, if the feedback gains (Kp, Ki) are changed based on the assist gradient α as described above, the feedback gains are changed more appropriately. As a result, it is possible to increase the quietness while maintaining a good steering feel.

2) If the feedback gains are changed based on the assist gradient α, it is possible to accurately estimate the state where the likelihood that noise and vibration are generated is high, based on the assist gradient α.

Accordingly, the feedback gains are decreased only in the case where the absolute value of the assist gradient a exceeds the predetermined threshold (predetermined value α0), that is, only in the case where the absolute value of the assist gradient α is large (α0<|α|), namely, where amplification of the ripple component contained in the steering torque τ becomes obvious. Thus, it is possible to effectively suppress generation of noise and vibration. In addition, by narrowing down the situations where the feedback gains should be decreased, it is possible to effectively suppress occurrence of adverse effect due to a decrease in the response of the feedback control.

Hereafter, a second embodiment of the invention will be described with reference to the accompanying drawings. For the convenience of explanation, the same portions are those in the first embodiment will be denoted by the same reference numerals as those in the first embodiment, and description thereof will not be provided below.

Figure 7:
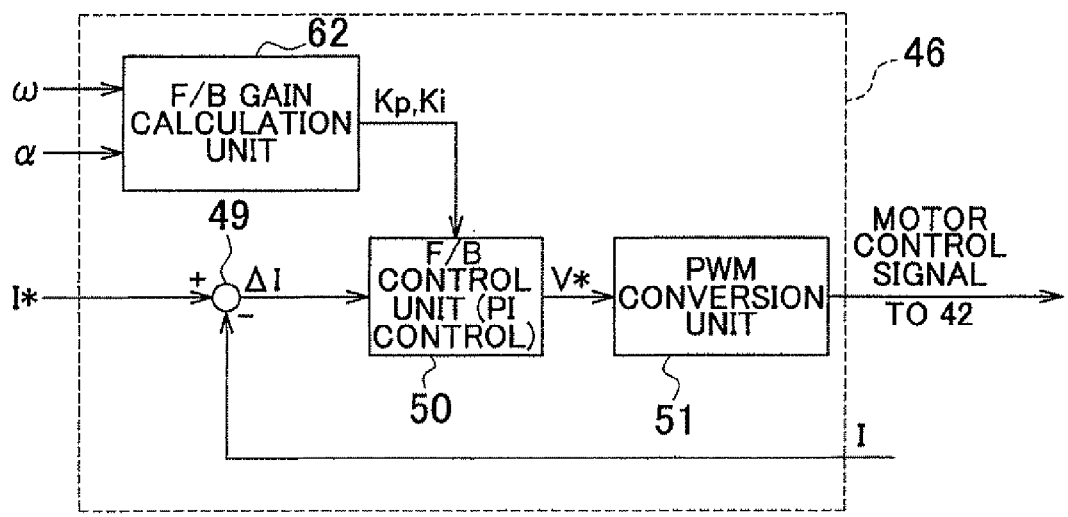
FIG. 7 is a diagram schematically showing the configuration of a motor control signal output unit according to a second embodiment.

As shown in FIG. 7, a feedback gain calculation unit 62 receives, in addition to the assist gradient α, the rotational angular speed of the steering wheel 2, that is, the steering speed ω.

The steering speed ω is calculated by differentiating the steering angle detected by an existing steering sensor (not shown). The feedback gain calculation unit 62 executes a variable control of the feedback gains (Kp, Ki) based on the detected steering speed ω.

Figure 8:
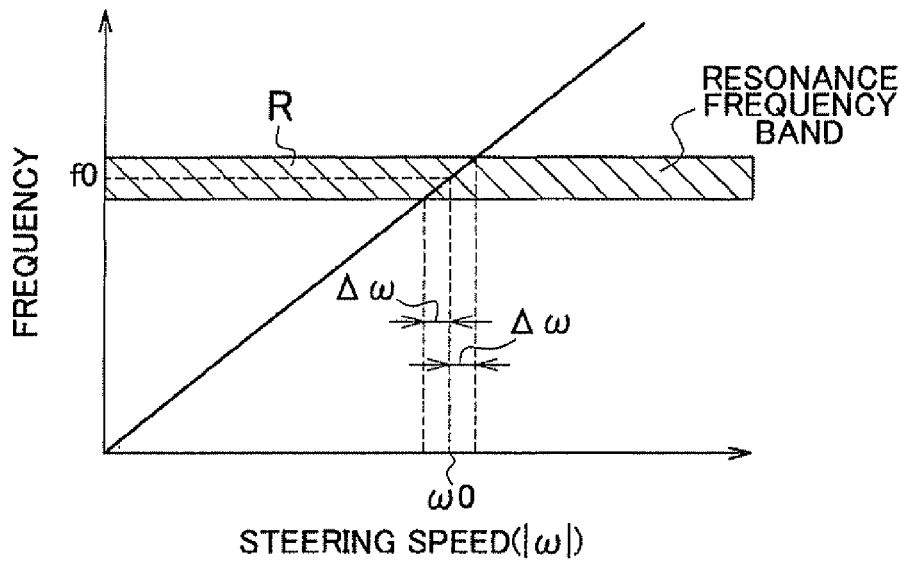
FIG. 8 is a graph showing the relationship between a resonance frequency and a steering speed.

The noise and vibration generated during a steering operation become obvious because, for example, a housing, a body or a frame resonates when the vibration generated due to an operation of the motor 21 used as the drive source is transmitted via these members. That is, as shown in FIG. 8, the frequency of vibration generated due to the operation of the motor 21 changes depending on the absolute value of the rotational angular speed, that is, the absolute value of the steering speed ω. Then, if the frequency of the vibration generated due to the operation of the motor 21 coincides with one of the resonance frequencies of the members via which the vibration is transferred and the member resonates, an occupant in a vehicle compartment realizes the vibration and noise.

Therefore, when the absolute value of the detected steering speed ω is within a predetermined speed range (ω0±Δω) which corresponds to a resonance frequency band R that is set using, as the reference, the resonance frequency f0 of the member that forms the transmission path through which the vibration generated due to the operation of the motor 21 is transmitted, the feedback gain calculation unit 62 decreases the feedback gains (Kp, Ki). Thus, it is possible to determine the situation where noise and vibration become obvious. As a result, it is possible to prevent the noise and vibration from becoming obvious while minimizing occurrence of the situation where the response of the feedback control decreases.

Figure 9:
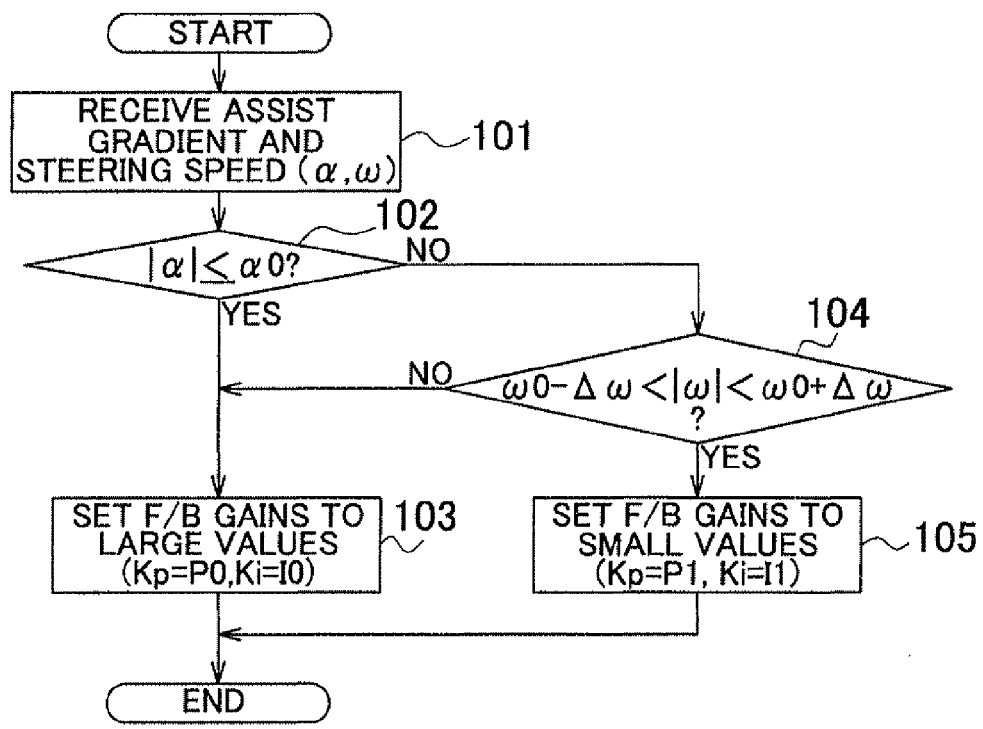
FIG. 9 is a flowchart showing the steps of a feedback gain variable control according to the second embodiment.

More specifically, as shown in a flowchart in FIG. 9, the feedback gain calculation unit 62 receives the assist gradient α and the steering speed ω (step 101), and determines whether the absolute value of the assist gradient α is equal to or smaller than the predetermined threshold (predetermined value α0) (step 102). When it is determined that the absolute value of the assist gradient cc is equal to or smaller than the predetermined value α0 (|α|≤α0: "YES" in step 102), the feedback gains that are output to the feedback control unit 50 are set to large values, more specifically, the proportional gain Kp and the integral gain Ki are set to large values (Kp=P0, Ki=I0 in step 103), as in the first embodiment.

On the other hand, if is determined in step 102 that the absolute value of the assist gradient α exceeds α0 (|α|>α0: "NO" in step 102), the feedback gain calculation unit 62 determines whether the absolute value of the steering speed ω is within the predetermined speed range that corresponds to the resonance frequency band R that is set using the resonance frequency f0 as a reference (step 104).

More specifically, it is determined whether the absolute value of the steering speed ω is within the speed range from a value, obtained by adding Δω to the predetermined speed ω0 that corresponds to the resonance frequency f0, to a value, obtained by subtracting Δω from the predetermined speed ω0 (ω0±Δω). The values that are derived through experiments or calculations and stored in the feedback gain calculation unit 62 are used as the resonance frequency f0, the predetermined speed ω0 that corresponds to the resonance frequency f0, and the predetermined value Δω used to define the resonance frequency band R. Only when it is determined that the absolute value of the steering speed ω is within the predetermined speed range that corresponds to the resonance frequency band R (ω0−Δω<|ω|<ω0+Δω: "YES" in step 104), the feedback gains that are output to the feedback control unit 50 are decreased, that is, the proportional gain Kp and the integral gain Ki are set to small values (Kp=P1, Ki=I1 in step 105).

If it is determined in step 104 that the absolute value of the steering speed ω is not within the predetermined speed range that corresponds to the resonance frequency band R (|ω|<ω0−Δω, or |ω|≤ω0+Δω: "NO" in step 104), the feedback gains that are output to the feedback control unit 50 are not decreased. Then, step 103 is executed, as in the case where it is determined that the absolute value of the assist gradient cc is equal to or smaller than the predetermined value α0 (|α|≤α0: "YES" in step 102). In step S103, the feedback gains that are output to the feedback control unit 50 are set to large values, that is, the proportional gain Kp and the integral gain Ki are set to large values.

According to the second embodiment, the following effects are obtained in addition to the effects 1) and 2) described in the first embodiment.

3) The noise and vibration generated during the steering operation become obvious because the member that forms the transmission path resonates when the vibration generated due to the operation of the motor 21 is transmitted through the member. The frequency of the vibration generated by the operation of the motor 21 changes depending on the steering speed ω (rotational angular speed of the motor). Therefore, if the feedback gains (Kp, Ki) are decreased when absolute value the steering speed ω is within the predetermined speed range (ω0±Δω) that corresponds to the resonance frequency band R, it is possible to suppress the noise and vibration.

4) Even if the level of vibration generated due to the operation of the motor 21 is high, the vibration is not regarded as a problem as long as an occupant in the vehicle compartment does not realize the vibration. Therefore, as described above, the feedback gains (Kp, Ki) are decreased only when the absolute value of the steering speed ω is within the predetermined speed range (ω0±Δω) that corresponds to the resonance frequency band R even in the case where the absolute value of the assist gradient α is large (α0<|α|), that is, in the case where amplification of the ripple component contained in the steering torque τ becomes obvious. Thus, it is possible to effectively suppress the motor operation noise and vibration while minimizing the influence of a decrease in the response of the feedback control.

The above-described embodiments may be modified as follows.

In each embodiment described above, the invention is applied to the so-called column assist EPS 1. Alternatively, the invention may be applied to a so-called pinion assist EPS or a rack assist EPS. A brushless motor may be used as the motor that is used as the drive source.

In each embodiment described above, the feedback control unit 50 executes the proportional control and the integral control (PI control) as the feedback control. The feedback gain calculation unit 52 changes the proportional gain Kp and the integral gain Ki based on the assist gradient α and the steering speed ω. However, the feedback control is not limited to the PI control. As the feedback control, a so-called PID control that further includes a derivative control may be executed. In addition, the manner for changing the feedback gains is not particularly limited as long as at least one of the proportional gain Kp and the integral gain Ki is changed.

In each embodiment described above, the feedback gains are changed based on the assist gradient α in the following manner. The feedback gains are decreased when the absolute value of the assist gradient α exceeds the predetermined threshold. However, the manner for changing the feedback gains based on the assist gradient α is not limited to this. For example, the feedback gains may be decreased continuously or in a stepwise manner with an increase in the absolute value of the assist gradient α.

In the second embodiment described above, the steering speed ω is calculated based on the steering angle detected by an existing steering sensor (not shown). However, the manner for calculating the steering speed ω is not limited to this. For example, if there are wheel speed sensors that detect the wheel speed of a right wheel and the wheel speed of a left wheel, the steering speed ω may be calculated based on the steering angle obtained from the difference in wheel speed between the right wheel and the left wheel. When it is possible to detect the rotational angle of the motor, for example, when a brushless motor is used as the motor 21 that serves as the drive source, the steering speed ω may be detected based on the rotational angle of the motor. In this case, the steering speed ω is used as a basis for determining whether resonance of the vibration due to the operation of the motor 21 occurs as described above. Accordingly, the feedback gains may be changed based on the rotational angle of the motor that is detected or estimated.

In the second embodiment described above, the feedback gains (Kp, Ki) are decreased only when the absolute value of the steering speed ω is within the predetermined speed range (ω0±Δω) that corresponds to the resonance frequency band R even in the case where the absolute value of the assist gradient α is large (α0<|α|), that is, in the case where amplification of the ripple component contained in the steering torque τ become obvious. However, the manner for decreasing the feedback gains (Kp, Ki) is not limited to this. For example, when a priority is given to an increase in the quietness, the feedback gains (Kp, Ki) may be decreased when the absolute value of the steering speed ω is within the predetermined speed range (ω0±Δω) that corresponds to the resonance frequency band R even in the case where the absolute value of the assist gradient α is small, that is, in the case where the ripple component is less likely to be amplified. Thus, it is possible to more reliably suppress noise and vibration that are generated during the steering operation.

Figure 10:
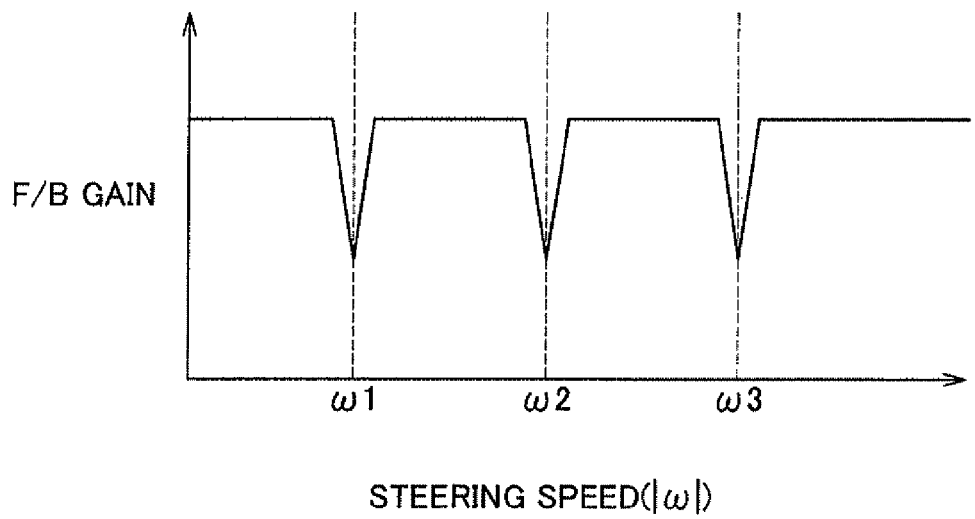
FIG. 10 is a graph illustrating a feedback gain variable control in another example.
Figure 11:
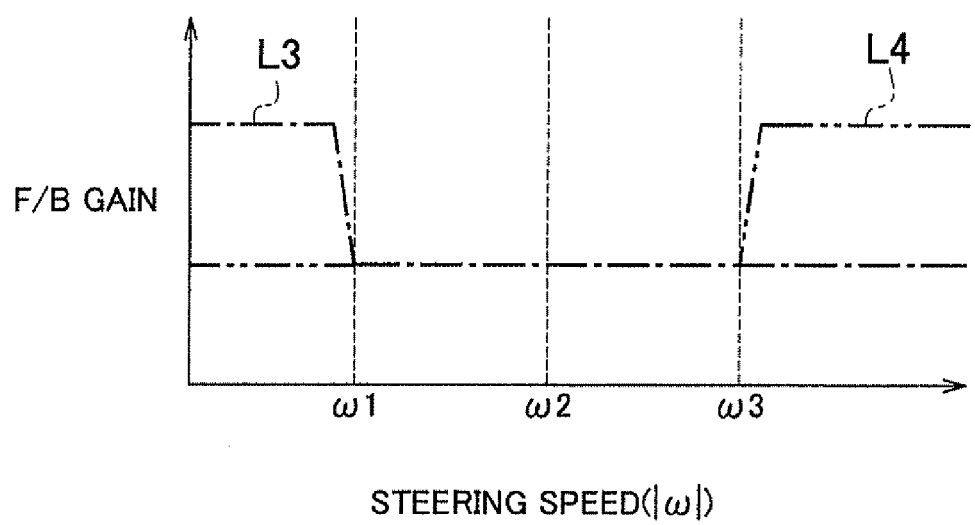
FIG. 11 is a graph illustrating a feedback gain variable control in another example.

In the second embodiment described above, the number of the steering speed (w0) that corresponds to the resonance frequency f0) is one. However, the configuration is not limited to this. As shown in FIG. 10, when there are multiple steering speeds ω (ω1, ω2, ω3) that correspond to the resonance frequency, the feedback gains may be decreased at each of the predetermined steering speeds ω1, ω2 and ω3. As shown in FIG. 11, the feedback gains may be set to large values when the absolute value of the steering speed ω is smaller than the predetermined steering speed ω1 that is the smallest among the steering speeds ω1, ω2, and ω3, and set to small values when the absolute value of the steering speed ω is equal to or larger than the predetermined steering speed ω1 (waveform L3 in FIG. 11). Alternatively, the feedback gains may be set to large values when the absolute value of the steering speed ω is larger than the predetermined steering speed ω3 that is the largest among the steering speeds ω1, ω2, and ω3, and set to small values when the absolute value of the steering speed ω is equal to or smaller than the predetermined steering speed ω3 (waveform L4 in FIG. 11).

In the second embodiment described above, a change in the feedback gains based on the assist gradient α and a change in the feedback gains based on the steering speed ω are made together (steps 103 and 105 in FIG. 9). Alternatively, a change in the feedback gains based on the assist gradient α and a change in the feedback gains based on the steering speed ω may be made separately. As a method for making a change in the feedback gains based on the assist gradient α and a change in the feedback gains based on the steering speed ω separately, for example, the following method may be employed. According to this method, a decrease gain based on the assist gradient α and a decrease gain based on the steering speed ω are calculated separately and then multiplied by the feedback gains.

Next, a technical concept that is ascertained from the above-described embodiments will be descried together with the effects.

In the electric power steering system, the feedback control includes the proportional control and the integral control, and at least one of the proportional gain and the integral gain is changed.

In the motor control executed in the EPS, the proportional control and the integral control (PI control) are usually executed as the feedback control. Accordingly, with the configuration described above, it is possible to improve the quietness by suppressing generation of noise and vibration.

What is claimed is:

1. An electric power steering system configured to assist a steering operation, the electric power steering system including a motor as a drive source, the electric power steering system comprising:
a steering force assist device configured to apply an assist force; and
a control unit configured to control an operation of the steering force assist device by adjusting a drive current that is supplied to the motor, wherein:
the control unit calculates a target assist force generated by the steering force assist device based on a steering torque, and executes a feedback control to adjust an actual current value to a current command value that corresponds to the target assist force, the feedback control being executed by multiplying a deviation of the actual current value from the current command value by a feedback gain, and the control unit changes the feedback gain based on separately calculating: (1) a decrease gain based on an assist gradient that is a ratio of a change in the target assist force to a change in the steering torque, and (2) a decrease gain based on a steering speed, and then multiplying the decrease gain based on an assist gradient and the decrease gain based on a steering speed.

2. The electric power steering system according to claim 1, wherein the control unit decreases the feedback gain when an absolute value of the assist gradient exceeds a predetermined threshold.

3. The electric power steering system according to claim 1, wherein the control unit decreases the feedback gain when a steering speed is within a predetermined speed range that corresponds to a resonance frequency band.

4. The electric power steering system according to claim 2, wherein the control unit decreases the feedback gain when a steering speed is within a predetermined speed range that corresponds to a resonance frequency band.

5. The electric power steering system according to claim 1, wherein the control unit does not change the feedback gain based on the assist gradient when a steering speed is not within a predetermined speed range that corresponds to a resonance frequency band.

6. The electric power steering system according to claim 2, wherein the control unit does not change the feedback gain based on the assist gradient when a steering speed is not within a predetermined speed range that corresponds to a resonance frequency band.

7. The electric power steering system according to claim 3, wherein the control unit does not change the feedback gain based on the assist gradient when the steering speed is not within the predetermined speed range that corresponds to the resonance frequency band.

8. The electric power steering system according to claim 4, wherein the control unit does not change the feedback gain based on the assist gradient when the steering speed is not within the predetermined speed range that corresponds to the resonance frequency band.

* * * * *